Patented Sept. 4, 1928.

1,683,535

UNITED STATES PATENT OFFICE.

CARLETON ELLIS, OF MONTCLAIR, NEW JERSEY.

SOLUBLE AND FUSIBLE WHITE ACETONE RESIN AND PROCESS OF MAKING SAME.

No Drawing.   Application filed May 25, 1923.   Serial No. 641,517.

This invention relates to resinous compositions made of or containing acetone resin which is white or very light in color and relates particularly to soluble and fusible acetone resin adapted for use as a varnish, lacquer or other coating compound, as a binder in making light colored molding compositions, for impregnating paper and for various other purposes.

The present invention involves treating a ketone, such as acetone or methyl acetone, with an aldehyde, such as formaldehyde or its polymers, or mixtures of formaldehyde with other aldehydes, for example acetaldehyde, the reaction being carried out in the presence of an alkali such as caustic soda.

An illustration will serve to make clear the procedure involved although it should be understood that the application is not limited thereby. 6 parts by weight of acetone and 45 parts of 40 per cent colorless aqueous formaldehyde solution were mixed and 5 parts by weight of a 50 per cent aqueous caustic soda solution were added. These proportions correspond to 6 parts of acetone to 18 parts of actual formaldehyde, or about one molecule of the ketone to six of the aldehyde. On allowing to stand for a few minutes reaction occurred without external heating and considerable heat was evolved. A whitish (nearly colorless), fusible, alcohol-soluble resin or gum was precipitated. This resin or gum was freed from alkali by washing. It then was obtained as a soft opaque mass, neither sticky nor elastic. In color it was almost white. The resin was very soluble in alcohol and a 50 per cent solution although viscous flowed very easily. When applied to a surface such as a sheet of glass, dried and subsequently baked, colorless remarkably tough films were formed. The baking temperature was carried to between 125–140° C. for a half hour or more to render the film unaffected by water. A coating of the unbaked resin is affected by water.

Neutral solutions of the resin in alcohol, acetone or other appropriate solvent may be employed as lacquers for metals and the like; the coating being applied for example by spraying and the article subsequently baked.

To obtain the white resin it is important to use a high grade formaldehyde as ordinary commercial formaldehyde solution is usually of a brownish color producing a resin of a brownish or strongly yellowish tone.

Clear masses of the resin may be obtained by allowing the material to stand in a warm place to eliminate moisture and solvents. The mass becomes clear and transparent. In this form it may be baked to produce transparent infusible products light in color.

The addition of caustic alkali or other alkaline catalyst accelerates the conversion to a heat-resistant product but also tends to bring about some discoloration.

The resin may be mixed with various fillers used in the plastic industry and employed for molding purposes.

Also it may be used as a sizing or coating for paper. Paper heavily impregnated with the resin may be cut into sheets which are superposed and subjected to pressure and a high temperature to compact the sheets to form a solid block.

It may be noted that the alcohol-soluble resin prepared as above is also soluble in concentrated aqueous hydrochloric acid.

The proportions given in the above illustration may be followed to advantage in making a colorless or substantially colorless product. If the amount of caustic soda is reduced materially a honey-like water-soluble substance is obtained. If the proportion of caustic soda is increased substantially, insoluble products result which cannot be used as solutions useful for various purposes as noted above. It is also desirable not to have the formaldehyde greatly diluted with water, a 40 per cent solution being appropriate for carrying out the reaction. Commercial paraform yields soluble products which sometimes contain a reddish precipitate of an insoluble character. This may be removed by filtration. The amount of water in the example will be seen to be only about 1¼ times the weight of the reacting materials (formaldehyde and acetone).

What I claim is:

1. A fusible resin soluble in alcohol prepared from about one mol. of acetone to six mols. of formaldehyde in the presence of aqueous caustic soda, said resin being substantially colorless.

2. The process of making a resinous composition which comprises reacting on approximately 6 parts by weight of acetone with 45 parts of 40 per cent colorless aqueous formaldehyde solution and 5 parts of a 50 per cent aqueous caustic soda solution whereby a colorless fusible and alcohol-soluble resin is precipitated, in collecting the resin and removing the alkali therefrom.

3. A process which comprises mixing about one molecular equivalent of a lower aliphatic ketone with six molecular equivalents of formaldehyde in the form of an aqueous solution, and an alkaline condensing catalyst, and thereafter removing the latter, while the resin product is soluble in alcohol, the total amount of water present being not substantially greater than 1¼ times the total amount of reacting substances.

4. A process which comprises mixing about one molecular equivalent of a lower aliphatic ketone with six molecular equivalents of formaldehyde in the form of an aqueous solution, and a caustic alkali as a condensing catalyst, and thereafter removing the latter, while the resin product is soluble in alcohol, the total amount of water present being not substantially greater than 1¼ times the total amount of reacting substances.

CARLETON ELLIS.